April 8, 1941.   E. O. SHREFFLER   2,237,507
SILENCER FOR GEAR SHIFT LEVERS AND RODS
Filed May 2, 1940

Inventor
Elwyne O. Shreffler
by James R. McKnight
his Attorney

Patented Apr. 8, 1941

2,237,507

UNITED STATES PATENT OFFICE 2,237,507

SILENCER FOR GEAR SHIFT LEVERS AND RODS

Elwyne O. Shreffler, Manteno, Ill.

Application May 2, 1940, Serial No. 333,011

3 Claims. (Cl. 74—490)

Among the objects of my invention is to provide a construction which can be immediately attached without the need of extraneous means to the steering post housing and gear shift rod of certain automobiles to eliminate the rattling and noise of the gear shift lever and the gear shift rod, and such other objects, advantages and capabilities as will later more fully appear and which are inherently possessed by my invention.

While I have shown in the accompanying drawing a preferred form of my invention, yet I desire it understood that the same is susceptible of modification and change without departing from the spirit of my invention.

Figure 1:
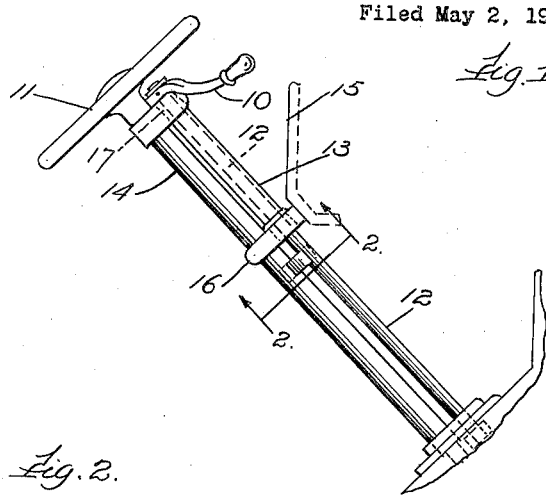
Figure 2:
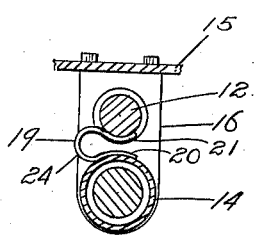
Figure 3:
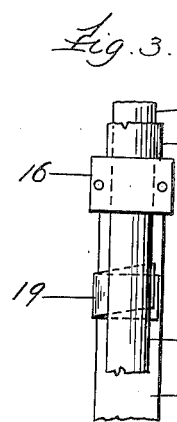
Figure 4:
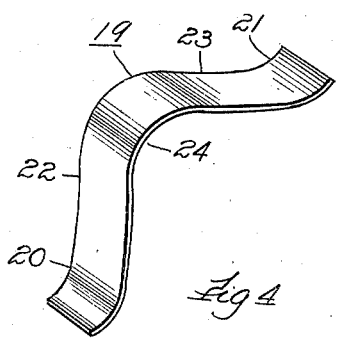
Figure 5:
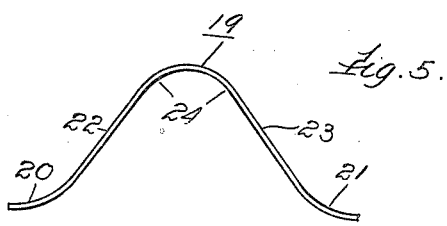

Referring to the drawing Fig. 1 is a side elevation of the steering post housing, gear shift lever, gear shift rod and housing of an automobile with which my silencer is used; Fig. 2 is a detail sectional view on line 2—2 of Fig. 1; Fig. 3 is a detail view showing my silencer in position during the vertical movement of the gear shift lever and rod; Fig. 4 is a perspective view and Fig. 5 an edge view of my silencer.

In the 1940 Chevrolet model automobile and certain other cars the gear shift lever 10 is positioned above the steering post housing 14. Attached to the gear shift lever 10 is a gear shift rod 12 which extends downwardly within a housing 13 and beyond the same to the gear mechanism of the car. A steering post housing 14 extends from the steering wheel 11 down through the floor board of the car for connections with the front wheel of the car.

The housing 13 of the gear shift rod 12 and the housing 14 of the steering post extend parallel downwardly and forwardly past the frame of the dashboard 15 to which they are attached by a member 16.

The gear shift rod 12 extends downwardly and forwardly beyond its housing 13 and continues parallel to and spaced from the steering post housing 14.

A bushing 17 in housing 13 is ordinarily adapted to hold gear shift rod 12 in position. After some use, bushing 17 wears and there is enough play between the gear shift rod 12 and bushing 17 to cause considerable rattling and noise.

The gear shift rod 12 is so constructed that it is capable of slight vertical movement to permit movement of the gear shift lever 10 to various shifting positions. This vertical movement if in excess of approximately one-half inch permits the gear shift lever 10 to strike against the top of the gear shift housing 13 and cause rattling and noise.

In combination with the above recited structure the preferred means selected for illustrating the solution of the problem created therein comprises a spring steel member 19 having opposite convex portions curved inwardly, downwardly and upwardly to form bearing portions 20 and 21, connected by integral upwardly curved tension side portions 22 and 23 and concave top portion 24. The spring member 19 is positioned by placing bearing portion 20 against steering post housing 14. Bearing portion 21 is placed against gear shift rod 12 immediately below the lower end of gear shift housing 13. The portions 20 and 21, being rounded, fit the rounded opposite inner surfaces of housing 14 and rod 12 and once in position are locked therewith and cannot accidentally release. Because housing 14 and rod 12 are spaced a shorter distance than the normal distance between portions 20 and 21 of spring member 19 it is necessary to force portions 22 and 23 closer together. The tension thus created causes spring member 19 to exert an outward pressure. This outward pressure on bearing portion 21 in turn exerts pressure on the gear shift rod 12 to hold it against the bushing 17. This eliminates the play therebetween and of course the rattling and noise.

The spring member 19 is so constructed that side portions 22 and 23 may be moved vertically with respect to the other for a very limited extent. Such limited movement will permit the gear shift rod to move just enough vertically to permit the gear shift lever to function whenever necessary vertically for shifting operation. Such vertical movement beyond approximately one-half inch is not necessary. Side portions 22 and 23 are so formed that they will not move vertically with respect to each other more than one-half inch. They therefore permit sufficient vertical movement for the proper operation of the gear shift rod and gear shift lever, but prevent movement therebeyond and thus prevent the gear shift lever from contacting the top of the gear shift housing. Rattling and noise caused thereby is therefore eliminated.

Having thus described my invention, I claim:

1. In combination with a steering wheel and post, and a gear shift construction having a gear shift lever positioned adjacent said steering wheel, a gear shift housing and a gear shift rod extending from said gear shift lever through and below said gear shift housing, said gear shift housing and said gear shift rod below said gear shift housing extending slightly spaced from and parallel to said steering post, and a bushing for said gear shift rod within said gear shift housing, said bushing being worn by wear and leaving play between it and said gear shift rod so as to cause rattling, a spring member having wide convex surfaces adjacent each end connected by a pair of upwardly extending portions forming a concave central tension portion, one of said convex surfaces adapted to fit against the steering post, the other of said convex surfaces adapted upon moving the upwardly extending portions closer together to fit against the gear shift rod immediately below the gear shift housing, said spring member so positioned exerting outward pressure against the gear shift rod and causing it to move against said bushing so as to eliminate play and any rattling therebetween.

2. In combination with a steering wheel and post, and a gear shift construction having a gear shift housing, a gear shift lever positioned above said gear shift housing and a gear shift rod extending from said gear shift lever through and below said gear shift housing, said gear shift housing and said gear shift rod below said gear shift housing extending slightly spaced from and parallel to said steering post, said gear shift rod vertically movable to permit manipulation of the gear shift lever, said vertical movement permitting the gear shift lever to contact and rattle on the top of the gear shift housing, a spring member having convex surfaces adjacent each end connected by a pair of upwardly extending portions forming a concave central tension portion, one of said convex surfaces adapted to fit against the steering post, the other of said convex surfaces adapted upon moving the upwardly extending portions closer together to fit against the gear shift rod immediately below the gear shift housing, said spring member so positioned permitting slight vertical movement of said gear shift rod for the manipulation of the gear shift lever but preventing further vertical movement and contact of the gear shift lever with the top of the gear shift housing so as to eliminate rattling therebetween.

3. In combination with a steering wheel and post, and a gear shift construction having a gear shift lever positioned adjacent said steering wheel, a gear shift housing and a gear shift rod extending from said gear shift lever through and below said gear shift housing, said gear shift housing and said gear shift rod below said gear shift housing extending slightly spaced from and parallel to said steering post, a bushing for said gear shift rod within said gear shift housing, said bushing being worn by wear and leaving play between it and said gear shift rod so as to cause rattling, said gear shift lever positioned above said gear shift housing, said gear shift rod movable vertically to permit manipulation of said gear shift lever to desired shifting positions, such vertical movement permitting said gear shift lever to contact and rattle on top of said gear shift housing, a spring member having wide convex surfaces adjacent each end connected by a pair of upwardly extending portions forming a concave central tension portion, one of said convex surfaces adapted to fit against said steering post, the other of said convex surfaces adapted upon moving the upwardly extending portions closer together to fit against said gear shift rod immediately below the gear shift housing, said spring member so positioned exerting outward pressure against said gear shift rod and causing it to move against said bushing so as to eliminate play and any rattling therebetween, said upwardly extending portions of said spring member movable vertically to a limited extent with respect to each other to permit slight vertical movement of said gear shift rod for the manipulation of said gear shift lever, but preventing further vertical movement and contact of said gear shift lever with the top of said gear shift housing so as to eliminate rattling therebetween.

ELWYNE O. SHREFFLER.